US011074556B2

(12) United States Patent
Kekalainen et al.

(10) Patent No.: US 11,074,556 B2
(45) Date of Patent: Jul. 27, 2021

(54) SMART WASTE COLLECTION SYSTEM REROUTING COLLECTION BASED ON WASTE CONTAINER ACCESSIBILITY

(71) Applicant: Enevo Oy, Espoo (FI)

(72) Inventors: Fredrik Kekalainen, Espoo (FI); Johan Engstrom, Tuusula (FI)

(73) Assignee: Enevo Oy, Espoo (FI)

( * ) Notice: Subject to any disclaimer, the term of this patent is extended or adjusted under 35 U.S.C. 154(b) by 109 days.

(21) Appl. No.: 16/449,767

(22) Filed: Jun. 24, 2019

(65) Prior Publication Data

US 2019/0311333 A1 Oct. 10, 2019

Related U.S. Application Data

(63) Continuation-in-part of application No. 14/443,983, filed as application No. PCT/EP2013/003547 on Nov. 25, 2013, now Pat. No. 10,332,197.

(30) Foreign Application Priority Data

Nov. 25, 2012 (GB) ...................... 1221164

(51) Int. Cl.
*G06Q 10/00* (2012.01)
*G06Q 10/04* (2012.01)
(Continued)

(52) U.S. Cl.
CPC ........... *G06Q 10/30* (2013.01); *G06Q 10/047* (2013.01); *G07C 9/00896* (2013.01);
(Continued)

(58) Field of Classification Search
CPC .. G06Q 10/30; G06Q 10/047; G07C 9/00896; G07C 2009/0092; H04W 4/029; H04W 4/38
See application file for complete search history.

(56) References Cited

U.S. PATENT DOCUMENTS 4,860,267 A * 8/1989 Herrington ............... B65F 1/14
368/10
5,416,706 A * 5/1995 Hagenbuch ............ G01G 19/08
177/136
(Continued)

OTHER PUBLICATIONS

Milic, Predrag et al., The Advanced System for Dynamic Vehicle Routing in the Process of Waste Collection Mechanical Engineering, vol. 9, No. 1,2011 (Year: 2011).*
(Continued)

*Primary Examiner* — Scott L Jarrett
(74) *Attorney, Agent, or Firm* — Ziegler IP Law Group, LLC

(57) ABSTRACT

A waste collection system includes waste containers for receiving waste, sensors associated with the waste containers, a server system for receiving signals from the sensors. The server system determines that a waste container needs to be collected, determines a location of the waste container and whether the waste container is in a waste collection vehicle accessible location. A notification is sent to an operator of the waste container if the waste container is not in a waste collection vehicle accessible location. When the waste container is moved to a waste collection vehicle accessible location, an optimal waste collection strategy for a waste collection vehicle to collect waste from the waste container at the waste collection vehicle accessible location is determined and the waste collection vehicle is routed to the location of the waste container.

20 Claims, 4 Drawing Sheets

Figure 1:
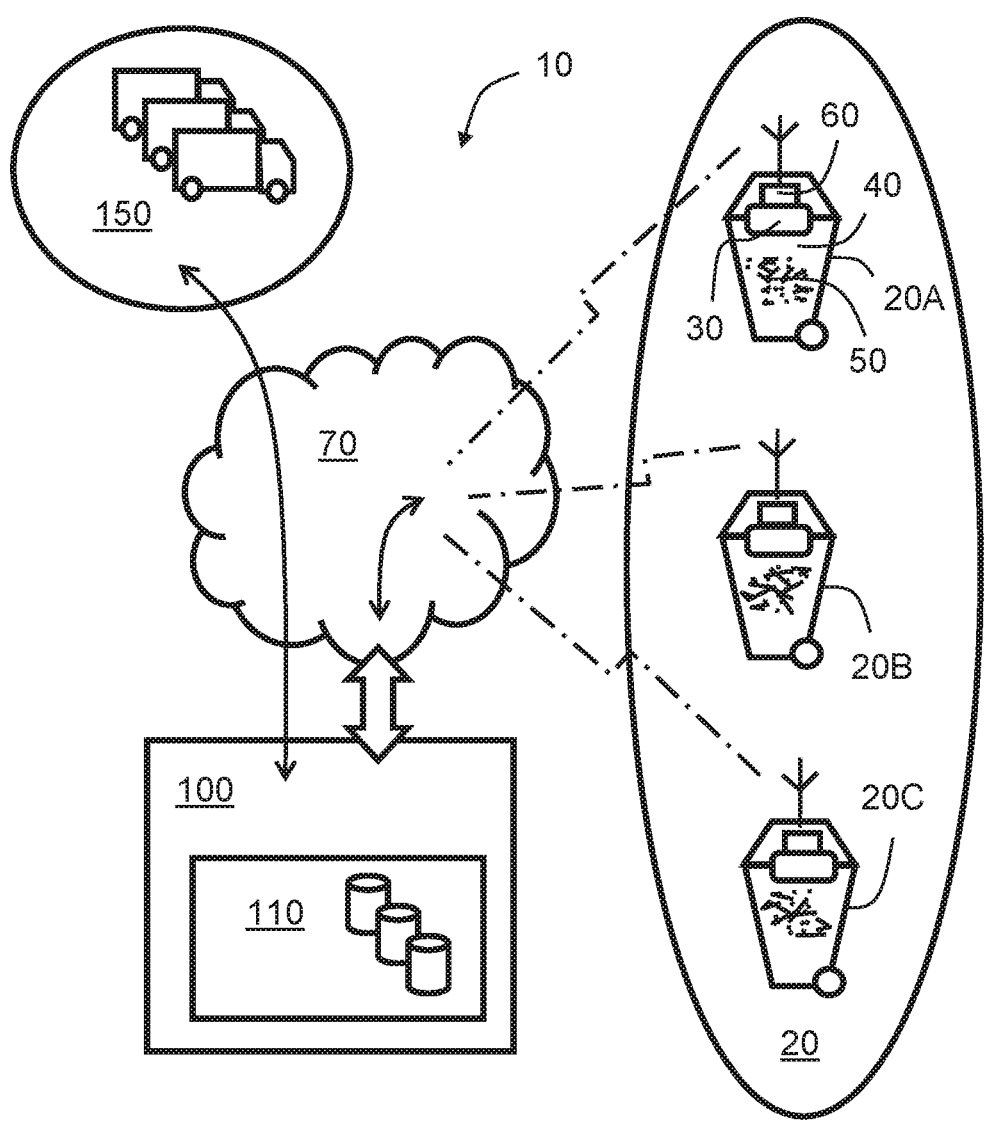

(51) Int. Cl.
*H04W 4/029* (2018.01)
*H04W 4/38* (2018.01)
*G07C 9/00* (2020.01)

(52) U.S. Cl.
CPC ............ *H04W 4/029* (2018.02); *H04W 4/38* (2018.02); *G07C 2009/0092* (2013.01)

(56) References Cited

U.S. PATENT DOCUMENTS

| | | | | |
|---|---|---|---|---|
| 6,123,017 | A * | 9/2000 | Little | B30B 9/3007 100/229 A |
| 6,148,291 | A * | 11/2000 | Radican | G06Q 10/08 705/22 |
| 7,395,237 | B1 * | 7/2008 | Hall | G06Q 10/08 705/26.44 |
| 7,406,402 | B1 * | 7/2008 | Waitkus, Jr. | G06Q 10/08 702/188 |
| 8,463,649 | B2 * | 6/2013 | Lutnick | G06Q 50/12 705/16 |
| 8,810,361 | B2 * | 8/2014 | Thukral | B65D 55/14 340/5.2 |
| 9,574,892 | B2 * | 2/2017 | Rodoni | G01C 21/3697 |
| 9,640,063 | B2 * | 5/2017 | Kekalainen | G08B 29/02 |
| 9,730,178 | B1 * | 8/2017 | Syrjalahti | G06Q 10/30 |
| 9,852,405 | B1 * | 12/2017 | Rodoni | G06Q 10/30 |
| 9,927,278 | B2 * | 3/2018 | Kekalainen | G01N 33/0009 |
| 9,930,429 | B2 * | 3/2018 | Kekalainen | H04Q 9/00 |
| 9,958,272 | B2 * | 5/2018 | Morris, IV | G01C 21/3415 |
| 10,037,679 | B1 * | 7/2018 | Crosby | B65F 1/14 |
| 10,072,966 | B1 * | 9/2018 | Frankel | G06K 7/1413 |
| 10,115,289 | B1 * | 10/2018 | Rodoni | G01G 23/365 |
| 10,223,667 | B2 * | 3/2019 | Repensek | G06Q 10/087 |
| 10,332,197 | B2 * | 6/2019 | Kekalainen | G06F 17/18 |
| 10,393,537 | B2 * | 8/2019 | Rodoni | G01C 21/367 |
| 10,798,522 | B1 * | 10/2020 | Benjamin | H04W 4/029 |
| 2001/0056396 | A1 * | 12/2001 | Goino | G06Q 40/04 705/37 |
| 2002/0087371 | A1 * | 7/2002 | Abendroth | G06Q 10/02 705/37 |
| 2003/0084125 | A1 * | 5/2003 | Nagda | G06Q 30/08 709/219 |
| 2004/0044605 | A1 * | 3/2004 | Kress Bodin | G06Q 40/00 705/35 |
| 2004/0230601 | A1 * | 11/2004 | Joao | G06Q 10/08 |
| 2005/0209913 | A1 * | 9/2005 | Wied | G06Q 10/083 705/12 |
| 2007/0192111 | A1 * | 8/2007 | Chasen | G06Q 10/08345 705/335 |
| 2009/0126473 | A1 * | 5/2009 | Porat | G01F 23/00 73/149 |
| 2010/0071572 | A1 * | 3/2010 | Carroll | B30B 9/3042 100/229 A |
| 2011/0218833 | A1 * | 9/2011 | Boss | G06Q 10/06316 705/7.26 |
| 2012/0010746 | A1 * | 1/2012 | Sundholm | G06Q 50/28 700/226 |
| 2012/0023033 | A1 * | 1/2012 | Tomasz | G06Q 30/0208 705/345 |
| 2012/0075099 | A1 * | 3/2012 | Brown | H04W 4/20 340/540 |
| 2012/0078743 | A1 * | 3/2012 | Betancourt | G06Q 10/08355 705/26.3 |
| 2013/0097095 | A1 * | 4/2013 | Rumig | G06Q 50/28 705/334 |
| 2014/0214697 | A1 * | 7/2014 | McSweeney | B65F 1/1484 705/308 |
| 2014/0236446 | A1 * | 8/2014 | Spence | G05D 1/0257 701/70 |
| 2014/0379588 | A1 * | 12/2014 | Gates | G06Q 10/30 705/308 |
| 2016/0071396 | A1 * | 3/2016 | Call | G08B 25/004 340/686.6 |
| 2016/0109251 | A1 * | 4/2016 | Thakur | G01C 21/343 705/335 |
| 2016/0176630 | A1 * | 6/2016 | Shahabdeen | B65F 1/14 206/459.1 |
| 2016/0300297 | A1 * | 10/2016 | Kekalainen | G06Q 10/08 |
| 2016/0379152 | A1 * | 12/2016 | Rodoni | H04W 4/02 705/7.15 |
| 2016/0379468 | A1 * | 12/2016 | Wu | H04M 1/72569 340/632 |
| 2017/0081120 | A1 * | 3/2017 | Liu | B65F 3/00 |
| 2017/0109704 | A1 * | 4/2017 | Lettieri | G06Q 10/1093 |
| 2017/0308871 | A1 * | 10/2017 | Tallis | G05B 15/02 |
| 2018/0158033 | A1 * | 6/2018 | Woods | G06Q 20/10 |
| 2019/0279169 | A1 * | 9/2019 | Ivanovic | G06Q 10/06311 |
| 2020/0082354 | A1 * | 3/2020 | Kurani | G01C 21/005 |

OTHER PUBLICATIONS

Catania, Vincenzo et al., An Approach for Monitoring and Smart Planning of Urban Solid Waste Management Platform Using Smart-M3 Platform, Proceedings of the 15th Conference on Fruct Association, Apr. 2014 (Year: 2014).*

Rovetta, Alberto et al., Early detection and evaluation of waste through sensorized containers for collection monitoring application Waste Management, vol. 29, 2009 (Year: 2009).*

* cited by examiner

SMART WASTE COLLECTION SYSTEM REROUTING COLLECTION BASED ON WASTE CONTAINER ACCESSIBILITY

TECHNICAL FIELD

The present disclosure relates to smart waste collection systems, for example to smart waste collection systems including one or more waste containers, also known as "trash containers", including a wireless-enabled monitoring arrangement, and a control centre for receiving waste-indicative signals from the one or more waste containers for devising an optimal schedule for one or more waste collection vehicles to collect waste from the one or more waste containers. Moreover, the present disclosure concerns methods of waste collection, for example to methods of monitoring one or more waste containers including a wireless-enabled monitoring arrangement, and operating a control centre for receiving waste-indicative signals from the one or more waste containers for devising an optimal schedule for one or more waste collection vehicles to collect waste from the one or more waste containers. Furthermore, the present disclosure relates to software products recorded on non-transient machine-readable data storage media, wherein the software products are executable upon computing hardware for implementing aforesaid methods.

BACKGROUND

In nature, populations of animals grow in proportion to available food supply; when populations of animals grossly exceed their available food supply, population collapse often results. In the case of the human population, a similar growth trend has occurred, on account of enhancements in methods of food production and availability of sources of energy, for example fossil hydrocarbon fuels, for providing energy for farming and food distribution. The human population is presently around 7 billion people and growing at an approximately exponential trajectory as a function of time. An eventually human population collapse from circa 9 billion people to around 500 million to 1 billion people is expected to occur at a point in time in the future as effects of "peak oil" begin to impact economies of technologically-advanced societies, and energy-per-capita begins to reduce to non-sustainable levels; such a scenario is elucidated in a publication "The Olduvai Theory: Energy, Population and Industrial Civilization", Dr. Richard C. Duncan, Winter 2005-2006, J. Social Contract. "Agenda 21" (United Nations initiative) is concerned with managed human population reduction to sustainable numbers.

In technologically-advanced societies, for example as a result of mechanisation in farming, a relatively smaller portion of human population is required to execute functions of food production and food distribution, enabling a remainder of the human population to concentrate on other activities, often within urban environments. From United Nations statistics, soon over 50% of World human population will be living in urban environments.

Human activity creates waste, wherein such waste needs to be removed from urban environments in order to avoid a disruption of orderly functioning of such urban environments. As human population grows as aforementioned, existing resources become divided amongst ever more people, such that an increase in operating efficiency of human society is needed if a standard of living enjoyed by people is to be maintained in future. Operating efficiency of human society can be increased by employing recycling, wherein waste in itself becomes a potential resource. However, recycling activities themselves require resources, for example hydrocarbon fossil fuel for propelling waste collection vehicles, and salaries of waste collection staff which are subsequently used by to buy products and services requiring resources for their implementation. Thus, it is important, for a sustainable human population, that waste recycling activities are implemented in such a manner that they provide a net real benefit to the population.

The exponential growth in urban human population, the development of social economy, and improvements in human living standards have resulted in a significant increase in the amount of waste generation. It has thus been necessary to develop new technologies which aid efficient management of waste in urban environments. More recently, urban waste has been viewed as a resource, especially when its materials can be recycled, thereby avoiding environmental damage resulting from primary resource extraction activities; for example, urban waste includes many organic materials which can be bio-converted to peat-like materials, and many combustible materials which can be employed as a source of heating fuel in communal incinerators, for example in combined heat-and-power facilities.

In order that urban waste can be most beneficially recycled and/or disposed of, it is desirable that waste disposal methods are as efficient as possible in relation to resource utilization, for example energy utilization and personnel resource utilization.

In a published United States patent no. U.S. Pat. No. 7,957,937B2 ("Systems and methods for material management"; Applicant—WM Trash Monitor Plus; Inventor—Waitkus), there is described a system and method for scheduling the emptying or replacement of a waste container based upon a degree to which the container is filled with waste, or a pattern of usage of the container. Such factors are considered to predict when the waste container will become completely full, and thus requiring to be emptied. Moreover, the system and method are operable to consider customer preferences and/or limitations of a waste hauler which is utilized to empty the waste container; the system and method determine, based upon the factors, an optimal time for the waste container to be emptied or replaced by the waste hauler. Furthermore, the factors are also used to determine when to accomplish suitable scheduling, namely when to notify the waste hauler that the waste container should be emptied or replaced at a given time. The method employs a computerized scheduling sub-system for scheduling purposes.

Smart waste containers are known; for example, in a published United States patent application no. US2009/0126473A1 ("Method and device to indicate the content of garbage cans and vessels"; Inventors—Porat, Havosha, Shvarzman and Katan), there is described a measuring arrangement for measuring the content of vessels and relay that information to persons remote from the vessels. The measurement arrangement is implemented, for example, as volume sensors, photo-detectors or lasers. The relay of information is optionally implemented via wires or wirelessly. Beneficially, the vessels are garbage cans. A display included on the garbage is used to indicate to users a volume of garbage in the garbage can. Optionally, wireless transmission of the volume information to a remote receiver is implemented, wherein the volume information is translated to a readable format so that garbage collectors are able to receive an overview of which garbage cans to empty and which may be left until a following collection.

Although aforesaid systems and apparatus for smart waste container collection are known, there exists a need for a waste collection system which is more optimized for the collection of waste in urban environments.

Waste management industries are growing and need efficient processes to increase revenue margins and to optimize associated resource utilization. From data provided in "Environmental Business International" publication, the US solid waste industry has grown from a value of 39.4 billion US dollars in the year 2000 to a value of 52.40 billion US dollars in the year 2010.

Waste collection companies face various challenges when implementing collection of waste from various sites and recycling stations at different locations; the challenges include the following, for example:
(i) planning and scheduling routes for waste haulers to employ for ensuring maximum waste collection;
(ii) avoiding penalties, for example fines from municipal authorities, for delayed collection of waste, for example where waste overflows from waste containers and potentially represents a safety and/or health hazard;
(iii) predicting customer waste generation patterns, for example based upon daily usage of waste containers, or during festivals and weekends when increased customer consumption of resources, for example food and drinks products, occurs; and
(iv) saving resources, and hence money, and reducing environmental impact of waste collection processes, for example less fuel consumption in waste collection vehicles, using less waste collection equipment, and optimizing waste collection intervals.

For example, it is highly inefficient for a waste collection vehicle to travel to a given site to empty a waste container which is only partially full of waste. It is desirable to improve an efficiency of waste collection, so that fewer resources are utilized in waste collection.

SUMMARY

The aspects of the disclosed embodiments seek to provide an improved smart waste collection system.

Moreover, the aspects of the disclosed embodiments seek to provide an improved method of smart waste collection.

According to a first aspect, the disclosed embodiments are directed to a waste collection system. In one embodiment, the waste collection system includes one or more waste containers for receiving waste; one or more sensors associated with the one or more waste containers, the one or more sensors including: a waste status sensor to determine one or more of a state and a volume of waste in the one or more waste containers; and a spatial position determining sensor for determining a location of the one or more waste containers; a server system for receiving one or more signals via a wireless communication network from the one or more sensors associated with the one or more waste containers, wherein the server system is configured to: determine that a waste container of the one or more waste containers is required to have waste collected therefrom; determine a location of the waste container; detect an access control signal associated with the location of the waste container, the access control signal indicating whether the location of the waste container is a waste collection vehicle accessible location; send a notification to an operator of the waste container if the access control signal indicates that the location of the waste container is not the waste collection vehicle accessible location; determine a change in the location of the waste container to the waste collection vehicle accessible location; compute an optimal waste collection strategy for a waste collection vehicle to collect waste from the waste container at the waste collection vehicle accessible location; and route the waste collection vehicle to the location of the waste container.

In a possible implementation form of the waste collection system, the server is configured to monitor the access control signal after sending the notification; and after a pre-determined time period has elapsed, send a second notification to the operator if the access control signal indicates that the waste container is not accessible by the waste collection vehicle.

In a possible implementation form of the waste collection system the server is configured to compute the optimal waste collection strategy by for the waste collection vehicle by: routing the waste collection vehicle to collect waste from the waste container upon determining that the waste container is required to have waste collected therefrom; monitoring the access control signal; and if the access control signal indicates that the location of the waste container is not accessible by the waste collection vehicle within a pre-determined period of time from when the waste collection vehicle is assigned, changing a route of the waste collection vehicle to bypass the location of the waste container.

In a possible implementation form of the waste collection system following the sending of the notification, the server is configured to: determine a rolling movement of the waste container; determine a length of the rolling movement of the waste container; and determine from the rolling movement and the length of the rolling movement whether a new location of the waste container is the waste collection vehicle accessible location; send a notification to the waste collection vehicle to collect the waste from the waste container; and reroute the waste collection vehicle along an optimum waste collection route to collect the waste from the waste container.

In a possible implementation form of the waste collection system the server is further configured to determine that the access control signal following the rerouting of the waste collection vehicle indicates that the waste container is not accessible by the waste collection vehicle; send another notification to the operator of the waste container; and reroute the waste collection vehicle to bypass the location of the waste container if the access control signal does not indicate that the waste container is in the waste collection vehicle accessible location within a pre-determined period of time from the sending of the another notification.

In a possible implementation form of the the waste collection system the server system is configured to modify the optimal waste collection strategy for the waste collection vehicle based on one or more of a type of the waste collection vehicle and a type of waste to be collected from the waste container, a spatial location of the waste collection vehicle relative to at least one other waste collection vehicle, a status of the waste collection vehicle relative to the at least one other waste collection vehicle, a waste capacity status of the at least one other waste collection vehicle, a degree of access of a given type of the at least one waste collection vehicle to a given waste container relative to a given type of access of at least one other waste collection vehicle to the given waste container relative to at least one other waste collection vehicle, a current route of the at least one waste collection vehicle relative to at least one other waste collection vehicle, current traffic conditions for the at least one waste collection vehicle relative to current traffic conditions of at least one other waste collection vehicle; and wherein one or more of the at least one waste collection vehicle and the at least one other waste collection vehicle is configured to change its current waste collection route in dependence upon the modified optimal strategy communicated from the server system to the at least one waste collection vehicle and the at least one other waste collection vehicle.

In a possible implementation form of the waste collection system the server is configured to detect a location and a waste capacity status of the one or more waste collection vehicles in substantially real-time for enabling the server system to dynamically modify the optimal strategy and communicate the modified optimal strategy to the at least one waste collection vehicle in substantially real-time, and change a current route of the at least one waste collection vehicle to another route during collection of the waste from the one or more waste containers.

In a possible implementation form of the waste collection system the one or more sensors include a user-actuated input sensor for enabling a user to signal to the server system that collection of waste of the container associated with the sensor arrangement is required to have waste collected therefrom and set the access control signal to indicate that the waste container is in the waste collection vehicle accessible location.

In another aspect, the disclosed embodiments are directed to a computerized method of operating a waste collection system including one or more waste containers for receiving waste and a server system for receiving one or more signals via a wireless communication network from one or more sensors associated with the one or more waste containers, wherein the server system includes at least one processor configured to execute non-transitory machine readable instructions configured to: determine that a waste container of the one or more waste containers is required to have waste collected therefrom; determine a location of the waste container; detect an access control signal associated with the location of the waste container, the access control signal indicating whether the location of the waste container is a waste collection vehicle accessible location; send a notification to an operator of the waste container if the access control signal indicates that the location of the waste container is not the waste collection vehicle accessible location; determine a change in the location of the waste container to the waste collection vehicle accessible location; compute an optimal waste collection strategy for a waste collection vehicle to collect waste from the waste container at the waste collection vehicle accessible location; and route the waste collection vehicle to the location of the waste container.

In a possible implementation form of the computerized method execution of the non-transitory machine readable instructions by the processor further causes the server system to: monitor the access control signal after sending the notification; and after a pre-determined time period has elapsed, send a second notification to the operator if the access control signal indicates that the waste container is not accessible by the waste collection vehicle.

In a possible implementation form of the computerized method the execution of the non-transitory machine readable instructions by the processor further causes the server system to compute the optimal waste collection strategy by for the waste collection vehicle by: routing the waste collection vehicle to collect waste from the waste container upon determining that the waste container is required to have waste collected therefrom; monitoring the access control signal; and if the access control signal indicates that the location of the waste container is not accessible by the waste collection vehicle within a pre-determined period of time from when the waste collection vehicle is assigned, changing a route of the waste collection vehicle to bypass the location of the waste container.

In a possible implementation form of the computerized method the execution of the non-transitory machine readable instructions by the processor further causes the server system to: determine a rolling movement of the waste container; determine a length of the rolling movement of the waste container; and determine from the rolling movement and the length of the rolling movement whether a new location of the waste container is the waste collection vehicle accessible location; send a notification to the waste collection vehicle to collect the waste from the waste container; and reroute the waste collection vehicle along an optimum waste collection route to collect the waste from the waste container.

In a possible implementation form of the computerized method the execution of the non-transitory machine readable instructions by the processor further causes the server system to: determine that the access control signal following the rerouting of the waste collection vehicle indicates that the waste container is not accessible by the waste collection vehicle; send another notification to the operator of the waste container; and reroute the waste collection vehicle to bypass the location of the waste container if the access control signal does not indicate that the waste container is in the waste collection vehicle accessible location within a pre-determined period of time from the sending of the another notification.

In a possible implementation form of the computerized method the execution of the non-transitory machine readable instructions by the processor further causes the server system to: modify the optimal waste collection strategy for the waste collection vehicle based on one or more of a type of the waste collection vehicle and a type of waste to be collected from the waste container, a spatial location of the waste collection vehicle relative to at least one other waste collection vehicle, a status of the waste collection vehicle relative to the at least one other waste collection vehicle, a waste capacity status of the at least one other waste collection vehicle, a degree of access of a given type of the at least one waste collection vehicle to a given waste container relative to a given type of access of at least one other waste collection vehicle to the given waste container relative to at least one other waste collection vehicle, a current route of the at least one waste collection vehicle relative to at least one other waste collection vehicle, current traffic conditions for the at least one waste collection vehicle relative to current traffic conditions of at least one other waste collection vehicle; and wherein one or more of the at least one waste collection vehicle and the at least one other waste collection vehicle is configured to change its current waste collection route in dependence upon the modified optimal strategy communicated from the server system to the at least one waste collection vehicle and the at least one other waste collection vehicle.

In a possible implementation form of the computerized method the execution of the non-transitory machine readable instructions by the processor further causes the server system to change a current waste collection route of the waste collection vehicle to a route that includes the location of the waste container.

In another aspect, the disclosed embodiments are directed to a computer program product recorded on non-transient machine-readable data storage media, wherein the computer program product is executable upon computing hardware for: determining that a waste container of the one or more waste containers is required to have waste collected therefrom; determining a location of the waste container; detecting an access control signal associated with the location of the waste container, the access control signal indicating whether the location of the waste container is a waste collection vehicle accessible location; sending a notification to an operator of the waste container if the access control signal indicates that the location of the waste container is not the waste collection vehicle accessible location; determining a change in the location of the waste container to the waste collection vehicle accessible location; computing an optimal waste collection strategy for a waste collection vehicle to collect waste from the waste container at the waste collection vehicle accessible location; and routing the waste collection vehicle to the location of the waste container.

In a possible implementation form of the computer program product the execution of the non-transitory machine readable instructions by the processor further causes the server system to: monitor the access control signal after sending the notification; and after a pre-determined time period has elapsed, send a second notification to the operator if the access control signal indicates that the waste container is not accessible by the waste collection vehicle.

In a possible implementation form of the computer program product the execution of the non-transitory machine readable instructions by the processor further causes the server system to compute the optimal waste collection strategy by for the waste collection vehicle by: routing the waste collection vehicle to collect waste from the waste container upon determining that the waste container is required to have waste collected therefrom; monitoring the access control signal; and if the access control signal indicates that the location of the waste container is not accessible by the waste collection vehicle within a pre-determined period of time from when the waste collection vehicle is assigned, changing a route of the waste collection vehicle to bypass the location of the waste container.

In a possible implementation form of the computer program product the execution of the non-transitory machine readable instructions by the processor further causes the server system to: determine a rolling movement of the waste container; determine a length of the rolling movement of the waste container; and determine from the rolling movement and the length of the rolling movement whether a new location of the waste container is the waste collection vehicle accessible location; send a notification to the waste collection vehicle to collect the waste from the waste container; and reroute the waste collection vehicle along an optimum waste collection route to collect the waste from the waste container.

According to another aspect, there is provided a waste collection system including one or more waste containers for receiving waste, a server system for receiving one or more signals via a wireless communication network from sensor arrangements included on the one or more waste containers for sensing a waste status of the one or more containers, characterized in that the server system is operable from receiving the one or more signals to compute an optimal strategy for one or more waste collection vehicles to collect waste from the one or more waste containers.

The aspects of the disclosed embodiments are of the advantage in that collection of waste can be optimized.

The aspects of the disclosed embodiments enable waste producers and collection operators to optimize waste collection quantities, waste collection routes adopted by waste collection vehicles and enhanced utilization of waste collection vehicles by, for example, only collecting full waste containers and thereby reducing unnecessary effort and resource utilization when collecting waste, optionally also recycling waste.

Moreover, the aspects of the disclosed embodiments are capable of saving money for waste collection services, and is also capable of reducing an environmental impact of waste collection and recycling, for example by using less fuel and equipment for executing waste collection.

Furthermore, the aspects of the disclosed embodiments are capable of improving safety and hygiene as full waste containers do not go unnoticed when the waste collection system is employed, namely no waste container overflow problems occur.

Additionally, the aspects of the disclosed embodiments are capable of providing live status information about monitored waste containers served by the waste collection system, for example fill-up rates of waste containers, estimated fill-up dates of waste containers, scheduled waste collection dates for waste containers, and seasonal variations which may affect waste containers.

Additionally, the aspects of the disclosed embodiments are capable of encouraging recycling of waste based on measured changes in recycling behaviour.

Optionally, in the waste collection system, the one or more sensor arrangements of the one or more containers are arranged for determining whether or not the waste is in a fermenting and/or biodegraded state which could represent a health hazard, and for determining and sending corresponding information to a server system controlling the waste collection system, and the one or more sensor arrangements include a combination of a temperature sensor and a methane sensor to measure a level of fermentation and/or biodegradation of the waste.

Optionally, in the waste collection system, the server system is operable to employ Monte Carlo simulation to search a multi-dimension search space defined by parameters (A) influencing the one or more waste containers to determine the optimal strategy. More optionally, in the waste collection system, the one or more waste collection vehicles are provided with vehicle sensor arrangements for sensing spatial locations of the one or more vehicles and their waste capacity status in real-time for dynamically modifying the optimal strategy in real-time during collection of the waste from the one or more waste containers.

Optionally, in the waste collection system, the sensor arrangements of the one or more containers each include a waste status sensor arrangement for determining a volume of waste in a corresponding waste container, and a spatial position determining sensor for determining a spatial location of the corresponding waste container. More optionally, in the waste collection system, the sensor arrangement includes a user-actuated input sensor for enabling a user to signal to the server system that collection of waste of the container associated with the sensor arrangement is required to have waste collected therefrom.

Optionally, in the waste collection system, the server system includes a user portal for enabling competitive bidding from operators of the one or more vehicles to collect waste from one or more of the waste containers.

Optionally, in the waste collection system, the server system is arranged:

to generate one or more signals to compute a plurality of job offers for receiving a plurality of bids from the one or more operators of the one or more vehicles to collect waste from one or more of the waste containers;

to receive one or more signals from the one or more operators of the one or more vehicles for sensing one or more vehicle status of the one or more vehicles;

to select a lowest bid from the plurality of bids provided by the one or more operators of the one or more vehicles to collect waste from one or more of the waste containers;

to notify the one or more operators of the one or more vehicles of the selection of the lowest bid; and to track the job offer until collection of waste from the one or more of the waste containers.

More optionally, in the waste collection system, one or more signals are used to compute a plurality of job offers, wherein the plurality of job offers is based on signals provided from the waste status sensor arrangement and the spatial position determining sensor of container and vehicle type and status.

More optionally, in the waste collection system, the system is arranged to receive vehicle status of the one or more operators of the one or more vehicles, wherein the vehicle status is pre-entered by the one or more operators of the one or more vehicles.

According to a second aspect, there is provided a waste container for use with the waste collection system pursuant to the first aspect: there is provided a waste container including a sensor arrangement for determining a waste status of the waste container and sending corresponding information to a server system controlling the waste collection system.

According to a third aspect, there is provided a method of operating a waste collection system including one or more waste containers for receiving waste, a server system for receiving one or more signals via a wireless communication network from sensor arrangements included on the one or more waste containers for sensing a waste status of the one or more containers, characterized in that the method includes:

(a) operating the server system to receive the one or more signals from the sensor arrangement; and (b) computing from the one or more signals an optimal strategy for one or more waste collection vehicles to collect waste from the one or more waste containers.

Optionally, the method includes operating the server system to employ Monte Carlo simulation to search a multi-dimension search space defined by parameters (A) influencing the one or more waste containers to determine the optimal strategy. More optionally, the method includes providing the one or more waste collection vehicles with vehicle sensor arrangements for sensing spatial locations of the one or more vehicles and their waste capacity status in real-time for dynamically modifying the optimal strategy in real-time during collection of the waste from the one or more waste containers.

Optionally, the method includes:

(d) operating the one or more sensor arrangements of the one or more containers to determine whether or not the waste is in a fermenting and/or biodegraded state which could represent a health hazard;

(e) determining and sending corresponding information to the server system controlling the waste collection system; and (f) arranging for the one or more sensor arrangements to include a combination of a temperature sensor and a methane sensor to measure a level of fermentation and/or biodegradation of the waste.

Optionally, the method includes incorporating in each of the sensor arrangements of the one or more containers a waste status sensor arrangement for determining a volume of waste in a corresponding waste container, and a spatial position determining sensor for determining a spatial location of the corresponding waste container. More optionally, the method includes arranging for the sensor arrangement to include a user-actuated input sensor for enabling a user to signal to the server system that collection of waste of the container associated with the sensor arrangement is required to have waste collected therefrom.

Optionally, the method includes providing via the server system a user portal for enabling competitive bidding from operators of the one or more vehicles to collect waste from one or more of the waste containers.

According to a fourth aspect, there is provided a software product recorded on machine-readable data storage media, characterized in that the software product is executable upon computing hardware for implementing a method pursuant to the third aspect.

It will be appreciated that features of the invention are susceptible to being combined in various combinations without departing from the scope of the invention as defined by the appended claims.

DESCRIPTION OF THE DIAGRAMS

Figure 2:
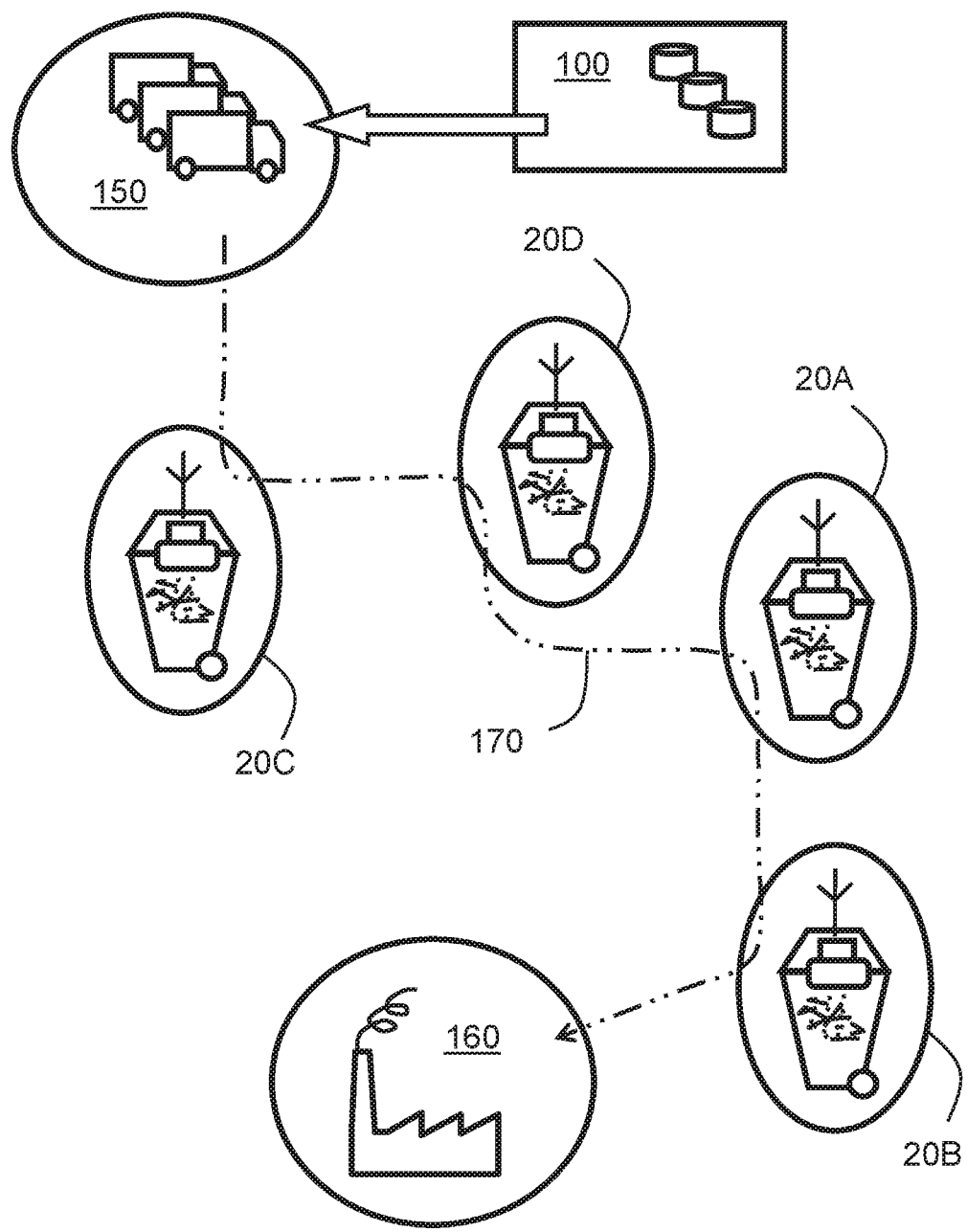
Figure 3:
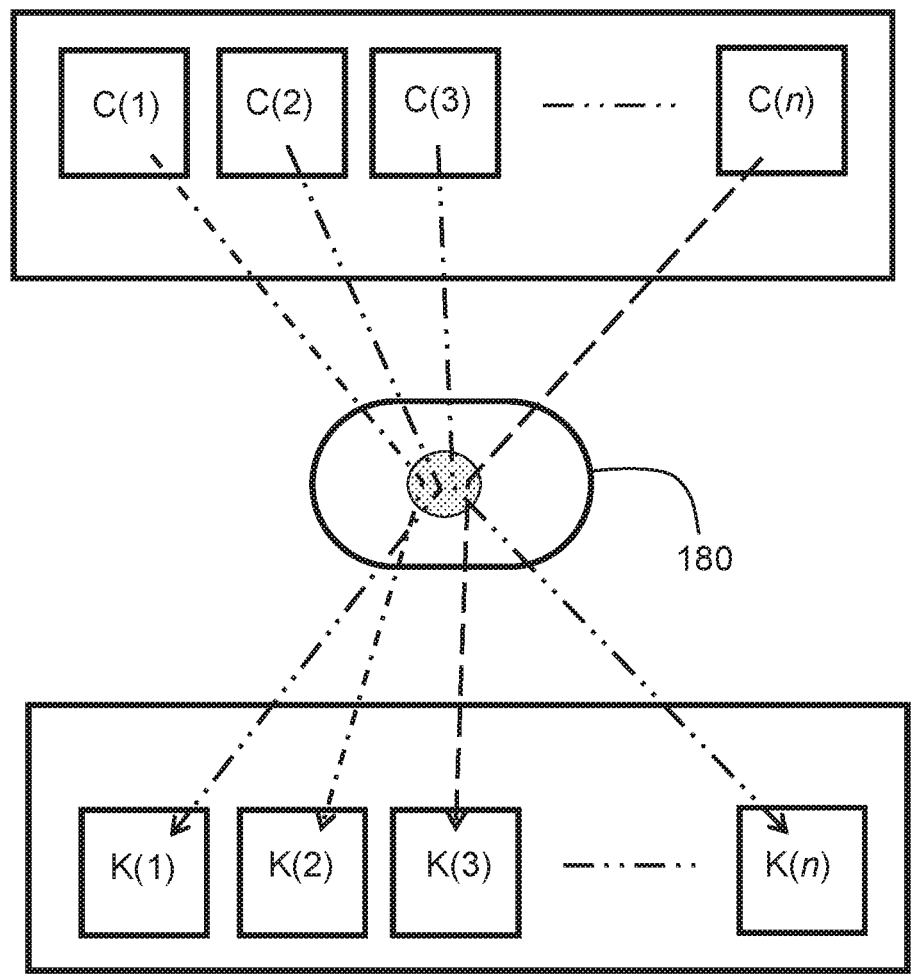
Figure 4:
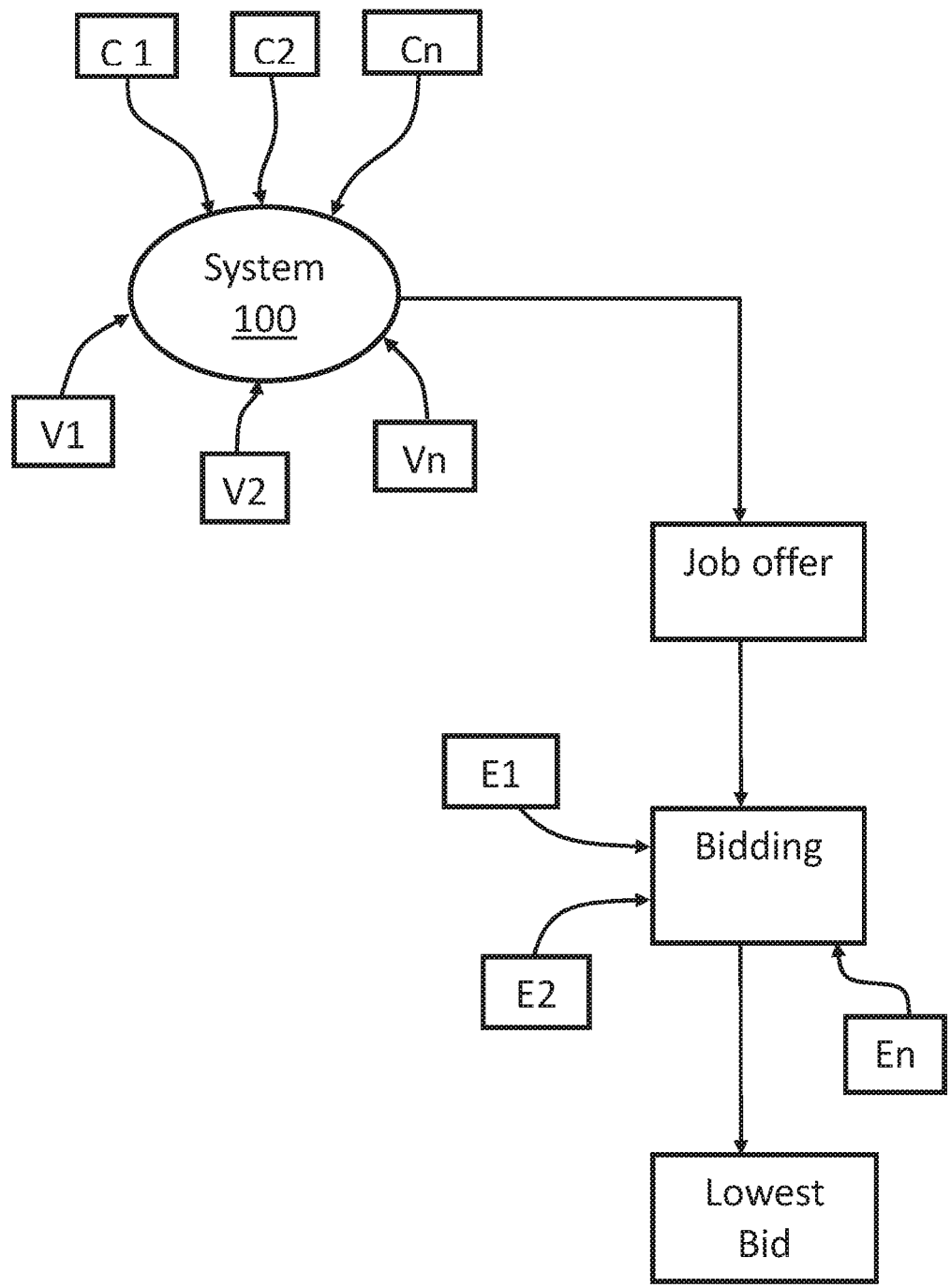

Embodiments of the present disclosure will now be described, by way of example only, with reference to the following diagrams wherein:

FIG. 1 is an illustration of a waste collection system implemented pursuant to the present disclosure;

FIG. 2 is an illustration of an example route followed by a waste collection vehicle to collect waste from a plurality of waste containers disposed at various spatial locations within an urban environment; and FIG. 3 is a mapping employed when performing optimization computations for the waste collection system of FIG. 1; and FIG. 4 is an illustration of steps of a method for a bidding process of the disclosure.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

Referring to FIG. 1, there is shown an illustration of a waste collection system indicated generally by 10. The system 10 includes one or more waste containers 20, namely "trash cans". Each waste container 20 includes, for example in its pivotally-mounted lid, a sensor arrangement 30 for monitoring one or more physical parameters of an inside volume 40 within the waste container 20, wherein the inside volume 40 is designed to receive waste. The sensor arrangement 30 includes one or more sensors for monitoring an extent to which the inside volume 40 is occupied by waste 50. Optionally, the sensor arrangement 30 includes a flammable gas sensor for measuring whether or not the waste 50 is in a fermenting and/or biodegrading state which could represent a health hazard; beneficially, the gas sensor is implemented according to at least one of:

(i) a solid-state methane sensor;

(ii) an electro-chemical gas concentration sensor;

(ii) a pulsed hot-wire pellistor sensor; and
(iii) an infra-red absorption sensor, for example based upon a MEMs tunable radiation filter for enable one of more infra-red active gas concentration to be measured; optionally active electronic parts of a sensor are disposed outside the container, and an optical gas-absorption part of the sensor is implemented within the container 20.

Optionally, the sensor arrangement 30 includes a position sensor, for example a position sensor based upon GPS or GPRS measurement, for determining a spatial location of the waste container 20 within an urban environment. The waste container 20 also includes a wireless interface 60 coupled to the sensor arrangement 30 for receiving sensor signals therefrom; the wireless interface 60 is operable to communicate the sensor signals via a wireless communication network 70, for example GSM or 3G implemented, to a server system 100; the server system 100 is thus beneficially provided with periodic information, for example substantially real-time information, regarding an extent to which the one or more waste containers 20 are filled with waste, optionally also with an indication of a nature of the waste, and optionally spatial position information pertaining to the one or more waste containers 20 within the urban environment. Optionally, each waste container 20 is provided with a unique identification code by which the waste container 20 can be identified, wherein the unique identification code is also communicated via the wireless interface 60 to the server system 100. Information communicated from the one or more waste containers 20 to the server system 100 is stored in a database 110 associated with the server system 100.

The server system 100 is operable to maintain a simulated model of the one or more waste containers 20, namely their spatial locations within the urban environment, their degree of waste 50 filling their inside volume 40, a nature of waste in the waste containers 20 and a temporal rate at which they are being filled with waste 50. Moreover, the database 110 includes information regarding temporal patterns which modulate rates at which are generated by customers associated with the one or more waste containers 20; the temporal patterns optionally take into account holidays, festivals, and weather conditions for example; for example, biological waste which is susceptible to rapid oxidation at high ambient temperatures beneficially requires more frequent collection in order to avoid potential health hazards, for example spreading of dangerous microbes; for example, the sensor arrangement 30 also includes a temperature sensor for enabling the server system 100 to receive data indicative of temperatures within the one or more waste containers 20.

Moreover, biological waste potentially at times starts to break down, for example by way of fermentation of food and other bio-waste, such as sludge, which results in a break down of biodegradable material, for example as a result of alternating or changing conditions within the container 20. These changing conditions in the container 20 are measured and monitored over time by monitoring one or more of:
(i) a temperature within the container 20;
(ii) any gas generation occurring within the container 20;
(iii) a pressure within the container 20;
(iv) a colour of contents within the container 20;
(v) a density of contents within the container 20;
but not limited thereto. Break down processes occurring within the container 20 generates gases such as Hydrogen, methane and other hydrocarbon gases that potentially cause several unwanted problems in the environment, as well as health concerns, unwanted smells, explosion risks, and attracting insects and animals dependent upon where the container 20 is placed, By monitoring and measuring the content of the container 20, any generated gases or changing conditions beneficially allow for changes in a method employed when, for example, collecting the waste material, for example for use in biogas production through an anaerobic digestion process. Such biogas production also results in bad odor and air quality around the container 20, for example around restaurant premises, kitchens, yards. Moreover, such biogas production potentially results in structural deformation of the container 20 due to gases expanding, where there is a lack of sufficient ventilation from the container 20. Furthermore, such biogas production results in fire hazards and also affects a quality of the material within the container 20, for example in a situation where the material has started to ferment heavily, wherein the material cannot be used as efficiently in an anaerobic digestion plant for biogas production.

Beneficially, the waste collection system 10 also includes a sensor arrangement 30, 40 for determining a waste status of the waste container 20. Optionally, the sensor arrangement 30, 40 sends corresponding information to a server system 100 controlling the waste collection system 10, wherein the sensor arrangement 30, 40 is operable to monitor at least one of:
(i) methane concentration;
(ii) Carbon Dioxide concentration;
(iii) Carbon Monoxide concentration,
and other hydrocarbon gases generated during fermentation. Optionally, the sensor arrangement 30, 40 consumes negligible power and is operable over a wide range of temperature variations, in high humidity and in condensation areas. Optionally, a part of the sensor for measuring biodegradability of the waste 50, such as a gas sensor, is optionally located as a modular construction or addition to the sensor arrangement 30, 40, thereby allowing it to be added to a waste collection system with one or more sensors per container 20 when and if needed. Optionally the gas sensor could be arranged as an integrated part of the sensor arrangement 30, 40, as a complementing sensor next to the sensor arrangement 30, 40, or in a different position than the sensor arrangement 30, 40 if more appropriate to measure small changes in an environment within the container 20, or biodegradability of the waste 50 within the container 20. In another embodiment, the gas sensor is disposed outside the waste container 20 to monitor more than one container 20 at a time, namely the gas sensor is common to a plurality of the containers 20. The gas sensor, namely biodegradability sensor, is beneficially also used to measure the level of biodegradable material in the container 20, wherein, in most cases, the container 20 beneficially has a safety valve arranged in the upper part of the container 20 to cope in the event of dangerous levels of gas generation within the container 20, A commercial value of the container 20, and its waste 50, namely content, for pick up can be calculated based on a nature of the content, a level of fill of waste 50 within the container 20, a size of container 20, and a level of biodegradability of the content, namely waste 50.

The server system 100 is operable to compute an optimal strategy for a fleet of vehicles 150, for example one or more waste collection vehicles, to service the one or more waste containers 20, for example for maximizing profit for a refuse collection service or for reducing operating costs for the refuse collection service, whilst complying with safety requirements and service quality criteria to avoid imposition of fines and penalties for allowing one or more of the waste containers 20 to become overfilled and/or their waste 50 to reach a physical state that could represent a safety hazard (for example spread of disease and pests (for example rodents) arising from food wastes).

The optimal strategy devised by the server system 100, wherein the server system 100 includes computing hardware which is operable to execute one or more software products stored on machine-readable data storage media, is communicated to the fleet of vehicles 150 for guiding their route of travel for reaching the one or more containers 20, for removing their waste 50 into the vehicles 150 and transporting the waste 50 to one or more waste disposal or waste recycling facilities 160. Optionally, the optimal strategy includes devising a most efficient route 170 for a given vehicle 150 to take when servicing a plurality of waste containers 20 within the urban environment as depicted in FIG. 2.

Computing the optimal strategy is a non-trivial task because of a multi-dimensional nature of a solution space for devising the optimal strategy. Factors which can influence efficiency of performance of the fleet of vehicles 150 include one or more factors as given in Table 1:

TABLE 1 influencing factors

| Influencing factor | Factor detail |
| --- | --- |
| $A_1$ | a spatial location of a given waste container 20, for example expressed as a distance from a temporally previous container 20 along a route to the given waste container 20 |
| $A_2$ | a nature and state of the waste 50 included in the given waste container 20 |
| $A_3$ | a rate at which the given waste container 20 is filling with waste 50 |
| $A_4$ | a date on which the waste 50 in the given waste container 20 is to be collected, for example in respect of day in calendar year, holidays, festivals and so forth |
| $A_5$ | a degree of access of a given vehicle 150 to the given waste container 20, for example poor access for the vehicle 150 to reach the given container 20 increases a time required for the vehicle 150 to service to the given container 20 |
| $A_6$ | a potential penalty which may pertain to the given container 20, depending upon a nature of the waste 50 in the given container 20 |
| $A_7$ | traffic conditions which pertain along a route of travel of the vehicle 150 when travelling to reach the given waste container 20, for example traffic jams, scheduled road repairs, vehicle breakdowns, and so forth |

The factors in Table 1 are not exhaustive, such that the waste collection system 10 can take into account fewer or more factors when performing its optimization computations as will be described in more detail later.

The server system 10 is operable to maintain a model of the urban environment in which the waste collection system 10 is required to provide waste collection services, as well as well as representations C(i) of waste containers 20, wherein i is an index which uniquely defines each waste container 20, wherein i=1, 2, 3, . . . n, wherein n is a total number of waste containers 20 to be serviced in the urban environment.

The server system 100 is operable to implement a Monte Carlo analysis of a cost function F and a waste value function G for all combinations of vehicle 150 travel between the waste containers 20 that are to be serviced. This requires mapping the containers C(i) for i=1 to n to a test array K(j) as depicted in FIG. 3 via an order mapping function 180, corresponding to different possible routes of travel for the fleet of vehicles 150. The cost function F and the waste value function G, namely a financial value of the waste when recycling is pertinent, are pursuant to Equation 1 (Eq. 1) and Equation 2 (Eq. 2):

$$F = \sum_{j=1}^{m} (f(K_j(A_{j,1}, A_{j,2}, A_{j,3}, \ldots A_{j,q}))) \qquad \text{Eq. 1}$$

wherein
m=an index in a range of 1 to n;
q=factor type reference index;
f=collection cost function; and
F=total cost of making a collection of containers K in a range 1 to m.

Similarly, a recycling value of the waste 50 collected by the fleet of vehicles 150 can be computed from Equation 2 (Eq. 2):

$$G = \sum_{j=1}^{m} (g(K_j(A_{j,1}, A_{j,2}, A_{j,3}, \ldots A_{j,q}))) \qquad \text{Eq. 2}$$

wherein
m=an index in a range of 1 to n;
q=factor type reference index;
g=waste value function; and
G=total value from making a collection of containers K in a range 1 to m.

The order mapping function 180 enables different routes between the waste containers 20 to be simulated by the computation in the server system 100; all combination of routes are beneficially explored, even if some would be regarded as potentially inefficient and subsequently ignored for optimization purposes to save computing effort in the server system 100.

The server system 100 is operable to compute optimal values of the functions F and G as a function of the index m and order mapping function 180. When an optimal value for the functions F and G are found, the route as defined by the order mapping function 180 is then translated to a form suitable for instructing drivers of the fleet of vehicles 150 for executing a collection of waste 50 from selected one or more of the waste containers 20.

Optionally, during an execution of collection of the waste 50, the one or more vehicles 150 are equipped with GPS, or similar position detection sensors, and wireless interfaces for providing in real time an indication of positions of the one or more vehicles 150 to the server system 100, together with an indication of remaining waste holding capacity of the one or more vehicles 150, such that the server system 100 is operable to perform real time Monte Carlo computations, as aforementioned, to make optimization corrections to routes of travel of the one or more vehicles 150, for example in an event of one or more of the vehicles 150 being delayed in their collection round, one or more of the vehicles 150 having a breakdown and needing repair, one or more of the vehicles 150 having unexpectedly more waste collection capacity remaining, and so forth, so that the collection of waste 50 can be optimized in real time as environmental conditions influence the collection of the waste 50 from one or more of the containers 20. Optionally, vehicles 150 of the fleet are specialized in handling certain types of waste 50, and their routes are computed as aforementioned on a basis of containers 20 which are of a type that they are permitted to service for waste collection purposes.

The functions G, g are dependent upon a price for waste 50, namely price for "trash", for example metal and paper waste, which can be sold for reuse. Moreover, the functions F, f are dependent upon the cost of disposing of various types of, for example, hazardous toxic waste. The computation model executed in the server system 100 also computes an expected amount of waste 50 in the containers 20 as a function of time, taking into account waste collection activities in respect of the containers 20, to ensure that they do not become overfilled, thereby seeking to avoid imposition of penalties for over-filled containers 20. Optionally, the containers 20 are provided with a user-operable "please empty me" switch which users can actuate to send a message wirelessly to the server system 100 that emptying of their containers 20 is desirable, for example in anticipation by the users of activities being undertaken by the users that are likely to generate considerable waste, for example building renovation activities, pop-concerts, rave parties and so forth.

Beneficially, the server system 100 is operable to support a bidding system provided via, for example, at least one of: Internet, cellular communication networks, mobile applications and so forth; beneficially, a plurality of waste collection enterprises or individuals, each with its associated fleet of one or more vehicles 150, is able to bid competitively for executing collection of waste 50 from one or more of the containers 20, pursuant to an optimized collection plan proposed by the server system 100 as determined using Table 1, and Equations 1 and 2.

Optionally, the server system 100 collects a plurality of information from the sensors attached to the containers 20. The plurality of information relates to information such as accurate prediction that the containers are likely to be full, for example filled to 90% of their capacity, container type, container quantity at each location, waste fraction type, accurate prediction on the volume and weight of all waste in the containers, value of the waste (price per tonne), location of each container, distance between each location, and so forth. The plurality of information collected from the containers 20 is processed to generate a plurality of job offers for the plurality of waste collection enterprises. Depending upon a type of vehicle available from the waste collecting enterprise, the operator of the server system 100 beneficially implements a reverse auction, wherein those vehicles within range of an optimised collection route of well filled containers 20 of desirable type and quantity of waste for given vehicles are requested whether or not they want to execute a waste collection job and for what price. Optionally, the job offer displays information such as optimized route distance, waste value, total time required to complete the job, type of truck required, container type and waste fraction type and so forth. The plurality of job offer, for example, appears in a manner similar to that illustrated in Table 2.

TABLE 2

Example of Auction for executing a collection round

JOB OFFER ID: 231  Date/Time: Dec. 11, 2013, 12:09 am
Current bid: 122 USD  Time to bid left: 5 hours and 40 minutes
Total distance: 32 km
Material value: 227.7 USD (30 USD/1000 kg)
Quantity: 23 m3, 7590 kg
Total time (estimate): 230 minutes (3 h 40 minutes), ½ work shift
Waste fraction: Clear glass
Container type(s): 4, 6 and 8 yd front loading dumpsters Optionally, the server system 100 provides a portal wherein the various enterprises are able to enter parameters relating to their fleet of vehicles 150. The parameters pertain to details such as truck type (for example front loader, rear loader, side loader, crane), truck capacity, suitable waste fractions, what type of time slots the hauler can accept (2 hour, 4 hour or 8 hour jobs), geographical information about serviceable areas (geo fence), availability (time/date) and so forth. Beneficially, the portal allows various enterprises to bid on the plurality of job offers based on the information displayed by the plurality of job offers and the parameters relating to fleet of vehicles 150, wherein the portal allows various enterprises to bid based on the location of a vehicle within the fleet of vehicles, preferably within a range of for example ca 200 km. In applications of job offers in Towns and Cities the range may be more in the range of a radius of up to ca 50 km, or more preferably radius of up to ca 10 km from the based depot. Optionally, the portal provides real time information on the job offer and generates cost/profit potential for the various enterprises based on the parameters related to the fleet of vehicles. An embodiment of the portal includes a dash board with suitable container 20 pickups and Return-on-Investment (ROI) on any displayed task with information as outlined in Appendix A below.

Optionally, the server system 100 selects the lowest bid for a job offer and notifies the enterprises about the selection and the vehicle from the fleet of vehicles 150 for executing collection of waste 50 from one or more of the containers 20. The server system 100 beneficially tracks the plurality of job offers until completion of the job, wherein the tracking relates to providing route information to the vehicle, monitoring timing, monitoring an emptying event of each container 20, thereby ensuring that the job is complete. This allows competitive bidding from enterprises, such that the waste containers 20 are serviced for waste collection purposes in a most commercially efficient manner. The portal beneficially enables the waste-filled status of one or more of the waste containers 20 to be viewed by third parties, for example refuse collection enterprises, for example as a function of their unique identities, but not via their spatial location in order to maintain customer confidentiality.

Beneficially, the server system 100 also benefits the customer, wherein the customer pays for collecting waste from the waste containers 20. The customer only pays for their share of the winning bid. The server system 100 considers one or more following factors for determining the share of the customer, for example:

(i) containers 20 that are over 80% full;
(ii) material value goes to the hauler;
(iii) cost of overhead driving (to/from depot/dump);
(iv) the exact driving cost/share for collecting customer specific containers.

An embodiment of the benefits accrued to the customer are, for example, found in Appendix A below.

Optionally, the server system 10 is operable to invoice customers associated with the waste containers 20 as a function, optionally also nature, of waste 50 collected from their respective waste containers 20. Such invoicing is beneficially implemented automatically, for example via Internet communication such as e-mail, as a function of quantity of waste 50, thereby potentially encouraging generation of less waste 50 and hence more efficient resource utilization in the urban environment served by the waste collection system 10.

Contemporary known arrangements for collecting waste, for example agreed with municipal authorities, tend to be extremely static and employ fixed pricing arrangement, which stifles innovation and development of best practices in waste collection and waste recycling.

Optionally, the waste collection system 10 can be employed in conjunction with large undergrounds waste containers or surface containers, for example waste containers having an internal waste-receiving volume in a range of 1 m$^3$ to 10 m$^3$. The waste collection system 10 is capable of providing increased hygiene, thereby reducing a risk of spread of disease within urban environments; from a viewpoint of biological considerations, urban environments represent a large monoculture of human beings which is potentially susceptible to systemic pathogens, for example bubonic plague which caused the Black Death in the mediaeval epoch in Europe, where 30% of human population was eliminated. More efficient collection of waste 50 from the one or more containers 20 by utilizing the aspects of the disclosed embodiments is thus capable of reducing a risk in future of occurrence of such disease outbreak by preventing vectors of disease, for example rodents, from increasing in numbers.

In an alternative embodiment the bidding process for containers may also be applied in reverse so that it applies to containers or storage means needing to be filled up with content such as for example grain, milk, water, oil, sand, ballast, or other material or liquid. Bids would then be put in to complete a job where a truck or lorry completes a delivery of product to a depot or storage facility. The monitoring of such storage means would therefore be set up to indicate when e.g. a container is empty or approaching to be empty. This monitoring of storage means that need to be refilled as they approach an empty level of for example only 25% full, 15% full or less than 10% full may be used in applications such as Manufacturing sites, Harbours, Airports, Agriculture, Mining, Refineries and similar.

The aspects of the disclosed embodiments also provide for dynamic collection of waste and recycling containers. Due to the smart dynamic routing of the disclosed embodiments, the waste container collection service interval is not static, but rather, can occur based on need. As is described herein, the aspects of the disclosed embodiments can determine when a waste container(s) is ready to be emptied or collected. The routing of resources to enable collection can be arranged when a collection need is identified. However, while aspects of the disclosed embodiments enable the system disclosed herein to know when the waste container(s) need to be picked up, the customer may not always be aware of the collection need.

In one aspect, the waste collection system 10 of the disclosed embodiments includes one or more waste containers for receiving waste and one or more sensors associated with the one or more waste containers. The one or more sensors 30 can included a waste status sensor to determine one or more of a state and a volume of waste in the one or more waste containers and a spatial position determining sensor for determining a location of the one or more waste containers. The server system 100 in this embodiment is configured to determine that a waste container of the one or more waste containers 20 is required to have waste collected therefrom; determine a location of the waste container; and detect an access control signal associated with the location of the waste container. The access control signal is configured to indicate whether the location of the waste container is a waste collection vehicle accessible location.

In some cases, in order to enable collection, the container may need to be made available or accessible. For example, the container may need to be pulled out and rolled to the service area, or otherwise made available, to enable access to the waste container(s) for emptying and collection. If that does not occur, the collection and emptying of the waste container may not be possible.

It is not uncommon for waste and recycling containers to be in closed or locked areas at the customers facility. For example, the waste container may be in an underground garage or inside a locked waste enclosure or shed. In these situations, the waste collection truck and driver is not able to service the container unless the container is pulled out and rolled to an open area where the collection vehicle or truck can operate safely. These containers typically have wheels/casters for either manual or machine assisted rolling.

Some customers use janitorial or other facility service people to roll the containers out on fixed dates based on what has been agreed with the customer. These types of customers may need advance notice in order to make the container available.

Thus, the aspects of the disclosed embodiments also include send a notification to an operator of the waste container if the access control signal indicates that the location of the waste container is not a waste collection vehicle accessible location. The server 100 is configured to monitor the access control signal for an indication that the location of the waste container has changed to to the waste collection vehicle accessible location. In one embodiment, the server 100 can compute an optimal waste collection strategy for a waste collection vehicle to collect waste from the waste container at the waste collection vehicle accessible location; and route the waste collection vehicle to the location of the waste container.

In one embodiment, the state of the access control signal is determined by comparing a current location of the waste container 20 to a known waste collection vehicle accessible location or locations. A first state of the access control signal indicates a waste collection vehicle accessible location and a second state indicates a location that is not a collection vehicle accessible location.

In one embodiment, a movement of the waste container can be tracked. For example, a rolling movement of the waste container 20 can be detected. A time of the rolling movement can me monitored in order to determine an approximate length of the rolling movement of the waste container. These factors can then be used to whether a new location of the waste container is the waste collection vehicle accessible location and the state of the access control signal can be set accordingly.

In one embodiment, the one or more sensors can be configured to determine whether access to the waste container may be impeded or blocked. For example, while the waste container 20 may be in a waste collection vehicle accessible location, access to the waste container 20 could be blocked by an object, such as a car, for example. The one or more sensors 30 or a camera can be used to detect such as obstacle or object and send a signal to the server system 100. The server system 100 can send a notification to the operator of the waste container, as is further described herein.

The aspects of the disclosed embodiments provide for notifying the customer that a collection event is needed or about to occur. In one embodiment, the system 10 can send out an automatic notification via a suitable message service, such as for example, email, SMS, app notification, phone call (robo call) to the customer(s) that a container pull-out is requested on a certain day and for a certain time window. Typically, the time or time window will be when a collection vehicle 150 is planned to be at the pick-up location to pick up the waste container 20.

Since the waste container 20 has one or more sensors, or sensor arrangement 30, that includes not only fill level sensors, but also location and motion sensors, the system 10 can determine if the container 20 has been moved and is in a suitable position and/or location for collection and pick-up. The motion sensor of the sensor arrangement 30 can be configured and used to detect multi-directional horizontal movement (rolling) and length of the motion (how many seconds or minutes the rolling occured). This motion is a much different motion than a collection motion where the container is tilted, as can be determined by the accelerometer/motion sensor of the sensor arrangement.

Changes in the location of the waste container 20 can be determined using one or more of GPS, cellular triangulation or other wireless triangulation, such as Bluetooth and similar beacons. The system 10 is configured to determine if the container 20 has changed location, as well as determine if the container 20 is in a suitable or designated collection service area for the collection vehicle 150 to safely collect it, as is generally described herein.

In one embodiment, once the system 10 determines that a waste container 20 is due for service and/or collection, the system 10 determines the location of the container 20. From the location information, the system 10 determines whether the container 20 can be accessed by a collection vehicle 150. The customer can then be notified. In one embodiment, the customer is only notified if the waste container 20 requires collection and cannot be accessed. In another embodiment, the system 10 is configured to notify the customer that collection is required and advise the customer whether the waste container 20 can be accessed or not, based on the determined waste container location information.

In one embodiment, when the waste container 20 is not in a position to be accessed by the collection vehicle 150, the system 10 can wait until the location of the waste container 20 is updated to be in a suitable collection location. Once it is determined the waste container 20 is in a suitable collection location, a collection vehicle can be scheduled or rerouted to collect the waste container 20.

As an example, at a certain point in time it is determined that a waste container 20 is in need for collection. It is determined that a collection vehicle 150 is on a route that can accommodate the particular waste container 20. The collection vehicle 150 can then be scheduled or rerouted to service the waste container 20. As is described herein, the customer can be notified as to the collection as well.

In another case, it is determined that a waste container 20 is due for collection. However, the location of the waste container 20 makes it inaccessible for pick up. The customer is notified and provided a time, or time window, during which a scheduled collection vehicle 150 will make the pick up. If the system 10 determines that the waste container 20 is not in a suitable location for pick up prior to the scheduled pick up time, the pick up time is rescheduled and the collection vehicle 150 rerouted. In this manner, the collection vehicle 150 can be notified before it one or more of departs for or arrives at the pick up location that the waste container 20 is not accessible. In one embodiment, the pick up time might be rescheduled and the customer notified, or the customer may be required to provide a positive notification as to when the waste container 20 will be moved. The system 20 is configured to schedule, reschedule or reroute the waste collection vehicle 150 in order to maximize the user of resources as is generally described herein. The dynamic routing can be implanted in combination with any one of the embodiments that are described herein.

In one embodiment, the system 10 determines that the waste container 20 has been requested to be pulled out and rolled to a service location and the location information is validated by the sensor arrangement 40 in cooperation with other aspects of the system 10. The system 10 can then schedule the waste container 20 to be collected.

In one embodiment, if a pickup notification has been sent and the system 10 detects that the waste container 20 has not been rolled out appropriately within the given date/time frame to an appropriate location, the system 10 automatically determines to skip the location and recalculates the route for the day to utilize the freed up time/volume capacity of the collection vehicle 150 to serve other locations. This dynamic routing maximizes efficiency and the use of resources.

In one embodiment, if the system 10 determines that the waste container 20 cannot be collected immediately, the system 10 is configured to also send a notification using a messaging application, such as SMS, app, phone call, email, or such other suitable notification service, to the customer. The scheduling or pickup attempt can be marked as a billable service event into the system 10. In this manner, scheduling and scheduling attempts can be correspondingly invoiced to the customer as appropriate.

In one embodiment, if the system 10 has validated and determined that collection of the waste container 20 is possible, the system 10 is configured to send an notification to the customer about the service event. The notification can include details such as time of day (timestamp), measured fill level/volume of the collected materials and the actual cost charged from the customer for the collection event and associated disposal fees for the material volume detected.

The same above notifications and possible penalty fees can be provided by the system 10 regardless if the container 20 was a rolled container or just a container 20 that uses the sensor arrangement 40 in general but is not rolled out from an open area. For example, in one embodiment, the sensor arrangement 40 can be configured to determine if access to the waste container 20 is blocked. This could include for example, but not limited to determining if an object such as a car is blocking access to the waste container 20.

The sensor arrangement 30 can also be configured to determine if the particular waste container 20 contains materials that are not suitable for a particular type of collection vehicle 150. For example, the waste container 20 might be marked or designated as "contaminated" due to its content. The sensor arrangement 40 can be configured to determine that there is a car battery inside the waste container 20 the sensor arrangement 30 can be configured to determine that there are non-recyclable materials in a waste container 20 that is meant to contain only recyclable materials.

In one embodiment, if the sensor arrangement 30 determines that the waster container 20 is "contaminated" with unsafe/not appropriate material, the system 10 can be configured to generate or issue a fine that can be charged to the customer. The system 10 can be configured to automatically place the waste container 20 on hold from future route plans until it is verified, such as by the customer has verified via email, phone, web/mobile app tool (or other means) to the system 10 that the fault has been corrected. Once the verification is received, the system can add the location of the waste container 20 back into the normal dynamic route plan for future pick-ups.

The aspects of the disclosed embodiments are directed to a waste collection system includes waste containers for receiving waste, sensors associated with the waste containers, a server system for receiving signals from the sensors. The server system determines that a waste container needs to be collected, determines a location of the waste container and whether the waste container is in a waste collection vehicle accessible location. A notification is sent to an operator of the waste container if the waste container is not in a waste collection vehicle accessible location. When the waste container is moved to a waste collection vehicle accessible location, an optimal waste collection strategy for a waste collection vehicle to collect waste from the waste container at the waste collection vehicle accessible location is determined and the waste collection vehicle is routed to the location of the waste container.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

APPENDIX A

An example of a collection bidding process for containers 20 to be collected in 3 days is herewith provided, referring to FIG. 4 which outlines the process of bidding for collection of one or more containers.

Step 1

A customer 1 (C1) has 2 locations, a customer C4 has 3 locations and a customer C8 has 2 locations, so there are a total of 7 locations that need to have waste from their containers 20 be collected within 3 days.

The Enevo One Collect™ system is provided with following information for the aforesaid locations:
1. An accurate prediction that the containers are going to be full (for example at 90% of capacity);
2. Information regarding container type;
3. Information regarding container quantity at each location;
4. Information regarding waste fraction type;
5. An accurate prediction on a volume and weight of all waste in the one or more containers 20;
6. A value of the waste (price/ton) shown as Vn in FIG. 4;
7. A spatial location of each container 20; and
8. A distance between each location.

Step 2

The Enevo One Collect™ system then generates a job offer based on the above 8 parameters and thereafter it posts the offer to an open pool wherein potential waste collection service providers are able to bid for winning the job. The job offer is open for bidding for a limited time only and includes, for example, following information:
1. An estimate on a total optimized route distance for servicing all the locations and picking up all full containers thereat;
2. An estimate on the waste value (namely a brokerage price), quantity (a volume and a weight);
3. An estimate on time required to do the job (for example calculated based on a driving time between the locations, and a container-type-based collection time, a preparation time at the locations and a route entry and a depot driving time);
4. A truck type required or suitable for the job;
5. A waste fraction type; and
6. Information regarding container type or types.

Example

JOB OFFER ID: 231  Date/Time: Dec. 11, 2013, 12:09 am
Current bid: 122 USD  Time to bid left: 5 hours and 40 minutes
Total distance: 32 km
Material value: 227.7 USD (30 USD/1000 kg)
Quantity: 23 m3, 7590 kg
Total time (estimate): 230 minutes (3 h 40 minutes), ½ work shift
Waste fraction: Clear glass
Container type(s): 4, 6 and 8 yd front loading dumpsters Step 3

Waste/Recycling collection companies (namely haulers) enter the Enevo One Collect™ system and are able to monitor all open job offers and their current bidding status. The haulers have pre-entered information regarding their collection fleet (namely trucks). The information entered is:
1. Truck type (for example front loader, rear loader, side loader, crane);
2. Truck capacity;
3. Suitable waste fractions;
4. What type of time slots the hauler can accept (2 hour, 4 hour or 8 hour jobs);
5. Geographical information about serviceable areas (geofence); and
6. Availability (time/date)

The haulers then can monitor all suitable job offers based on the pre-entered fleet information. If a suitable job offer is available, the hauler is able to enter a bid into the system. The hauler gets real information on the job and the Enevo system is then operable to calculate accurately their cost/profit potential based on given parameters.

Step 4

The Enevo One Collect™ system handles the bidding process and selects the lowest bid for the job offer. The hauler winning the Engagement, shown as En in FIG. 4, takes on the job. The hauler is notified and the availability of the hauler's truck (namely suitable for this job) is locked for time/date required for the won job offer.

The Enevo One Collect™ system then calculates an optimal route for the hauler's truck to fulfil the job. The route information is calculated based on the pre-entered data on where the truck is located. This route optimization is a key parameter to take into account for implementing the job efficiently.

Step 5

The Enevo One Collect™ system follows each job offer and keeps tracking that the job is completed. The tracking is implemented based on the route calculation provided to the hauler, monitoring the timing, monitoring the emptying event of each container and fill level after the container was collected. This gives assurance to the waste producing customer that the work has been implemented.

Step 6

The winning bid fee is shared between the waste producing customers that had containers participating in the job offer. The fee is calculated and billed electronically (for example via credit card or PayPal) by the Enevo One Collect™ web system.

The fee is calculated based on a sum of following parameters:
1. A total overhead driving completed by the hauler on the job offer divided by the total sum of kilometres required to drive to collect the specific customers containers;
2. A total sum of kilometres required to drive to collect the customers' containers;
3. A time spent emptying the specific customers' containers (for example a 240 litre wheelie bin requires approximately 15 seconds for emptying, whereas a 8 cubic yard dumpster requires for 60 seconds for emptying);
4. A total quantity (namely volume and weight) picked up from the specific customers containers; and
5. Deducted with the value of the material.

Step 7

The winning bid fee collected from the waste producing customers is then deposited to the waste collection company account. Before depositing the money to the hauler, the Enevo One Collect™ system deducts a commission/brokerage fee for each billed job offer. Other factors taken into consideration during the collection bidding include at least one of: labour costs, driving costs, a preparation time, an energy capacity of container content, a market index, a value of container content.

In an alternative embodiment the bidding process for containers may also be applied in reverse so that it applies to containers or storage means needing to be filled up with content such as for example grain, milk, water, oil, sand, ballast, or other material or liquid. Bids would then be put in to complete a job where a truck or lorry completes a delivery of product to a depot or storage facility. The monitoring of such storage means would therefore be set up to indicate when e.g. a container is empty or approaching to be empty.

The invention claimed is:

1. A waste collection system, comprising:
a waste container for receiving waste;
one or more sensors associated with the waste container, the one or more sensors including:
a waste status sensor to determine one or more of a state of the waste container and a volume of waste in the waste container; and
a spatial position determining sensor that is configured to provide location information for determining a location of the waste container;
a server system for receiving one or more signals via a wireless communication network from the one or more sensors associated with the waste container, wherein the server system is configured to:
determine that the waste container is required to have waste collected therefrom;
determine a current location of the waste container based on a signal provided from the spatial position determining sensor;
compare the current location of the waste container to one or more known waste collection vehicle accessible locations;
determine whether the current location of the waste container is one of the one or more waste collection vehicle accessible locations based on the comparison;
send a notification over the wireless communication network to an operator of the waste container when it is determined that the current location of the waste container is not one of the one or more waste collection vehicle accessible locations;
detect an access control signal associated with the waste container, the access control signal indicating that the current location of the waste container is one of the one or more waste collection vehicle accessible locations;
determine whether access to the waste container in the current location of the waste container is blocked by an object;
and
when the access control signal indicates that the waste container is in one of the one or more waste collection vehicle accessible locations and access to the waste container is not blocked;
compute an optimal waste collection strategy for a waste collection vehicle to collect waste from the waste container at the current location;
select a waste collection vehicle from a plurality of waste collection vehicles to execute the optimal waste collection strategy based on a comparison of a current state and route of different ones of the plurality of waste collection vehicles; and
automatically route the selected waste collection vehicle to the location of the waste container; or
when it is determined that the access control signal indicates that the waste container is not accessible in one of the one or more waste collection vehicle accessible locations, the system server is configured to change a route of the selected waste collection vehicle to bypass the location of the waste container.

2. The waste collection system according to claim 1, wherein the server is configured to:
monitor the access control signal after sending the notification; and
after a pre-determined time period has elapsed, send a second notification to the operator over the wireless communication network when the access control signal indicates that the waste container is not in one of the one or more waste collection vehicle accessible locations.

3. The waste collection system according to claim 1, wherein the server is configured to compute the optimal waste collection strategy for the waste collection vehicle by:
routing the waste collection vehicle to collect waste from the waste container upon determining that the waste container is required to have waste collected therefrom;
monitoring the access control signal; and
when the access control signal indicates that the location of the waste container is not one of the one or more waste collection vehicle accessible locations within a pre-determined period of time from when the waste collection vehicle is assigned, changing a route of the waste collection vehicle to bypass the current location of the waste container.

4. The waste collection system according to claim 1 wherein, following the sending of the notification, the server is configured to:
determine a movement of the waste container; and
determine a length of the movement of the waste container; and
determine a new location of the waste container from the movement and the length of the movement;
determine whether the new location of the waste container is one of the one or more waste collection vehicle accessible locations by comparing the new location to the one or more known waste collection vehicle accessible locations;

send a notification to the waste collection vehicle over the wireless communication network to collect the waste from the waste container when the new location is one of the one or more waste collection vehicle accessible locations and access to the waste container in the new location is not blocked by an object; and reroute the waste collection vehicle along an optimum waste collection route to collect the waste from the waste container at the new location.

5. The waste collection system according to claim 4, wherein the server is further configured to:

determine that the access control signal following the rerouting of the waste collection vehicle indicates that the waste container is not in one of the one or more waste collection vehicle accessible locations;

send another notification to the operator of the waste container over the wireless communication network; and reroute the waste collection vehicle to bypass the location of the waste container when the access control signal does not indicate that the waste container is in one of the one or more waste collection vehicle accessible locations within a pre-determined period of time from the sending of the another notification.

6. The waste collection system according to claim 1, wherein the server system is configured to modify the optimal waste collection strategy for the waste collection vehicle based on one or more of a type of the waste collection vehicle and a type of waste to be collected from the waste container, a spatial location of the waste collection vehicle relative to at least one other waste collection vehicle, a status of the waste collection vehicle relative to the at least one other waste collection vehicle, a waste capacity status of the at least one other waste collection vehicle, a degree of access of a given type of the at least one waste collection vehicle to a given waste container relative to a given type of access of at least one other waste collection vehicle to the given waste container relative to at least one other waste collection vehicle, a current route of the at least one waste collection vehicle relative to at least one other waste collection vehicle, current traffic conditions for the at least one waste collection vehicle relative to current traffic conditions of at least one other waste collection vehicle; and wherein one or more of the at least one waste collection vehicle and the at least one other waste collection vehicle is configured to change its current waste collection route in dependence upon the modified optimal strategy communicated from the server system to the at least one waste collection vehicle and the at least one other waste collection vehicle.

7. The waste collection system as claimed in claim 1, wherein server is configured to detect a location and a waste capacity status of the waste collection vehicle in substantially real-time for enabling the server system to dynamically modify the optimal strategy and communicate the modified optimal strategy to the waste collection vehicle in substantially real-time, and change a current route of the waste collection vehicle to another route during collection of the waste from the waste container.

8. The waste collection system as claimed in claim 1, wherein the one or more sensors include a user-actuated input sensor for enabling a user to signal to the server system that collection of waste of the container associated with the sensor arrangement is required to have waste collected therefrom and set the access control signal to indicate that the waste container is in one of the one or more waste collection vehicle accessible locations.

9. A computerized method of operating a waste collection system, the waste collection system including a waste container for receiving waste and a server system for receiving one or more signals via a wireless communication network from one or more sensors associated with the waste container, wherein the server system includes at least one processor configured to execute non-transitory machine readable instructions, execution of the non-transitory machine readable instructions by the processor being configured to cause the server system to:

determine, based on a signal sent over the wireless communication network from a waste status sensor of the one or more sensors associated with the waste container that the waste container is required to have waste collected therefrom, the waste status sensor being configured to determine one or more of a state of the waste container and a volume of waste in the waste container;

determine, based on a location signal provided by a spatial position determining sensor of the one or more sensors, a current location of the waste container;

compare the current location of the waste container to one or more known waste collection vehicle accessible locations;

determine whether the current location of the waste container is a waste collection vehicle accessible location based on the comparison;

send, over the wireless communication network, a notification to an operator of the waste container when it is determined that the current location of the waste container is not one of the waste collection vehicle accessible locations;

detect an access control signal associated with the waste container, the access control signal indicating that the current location of the waste container is one of the one or more waste collection vehicle accessible locations;

determine whether access to the waste container in the current location of the waste container is blocked by an object; and when the access control signal indicates that the waste container is in one of the one or more waste collection vehicle accessible locations and access to the waste container is not blocked;

compute an optimal waste collection strategy for a waste collection vehicle to collect waste from the waste container at the current location; and automatically route the waste collection vehicle to the current location of the waste container; or when it is determined that the access control signal indicates that the waste container is not accessible in one of the one or more waste collection vehicle accessible locations, change a route of the selected waste collection vehicle to bypass the location of the waste container.

10. The computerized method according to claim 9, wherein the execution of the non-transitory machine readable instructions by the processor further causes the server system to:

monitor the access control signal after sending the notification; and after a pre-determined time period has elapsed, send a second notification to the operator over the wireless communication network when the access control signal indicates that current location of the waste container is not one of the one or more waste collection vehicle accessible locations.

11. The computerized method according to claim 9, wherein the execution of the non-transitory machine readable instructions by the processor further causes the server system to compute the optimal waste collection strategy by for the waste collection vehicle by:
routing the waste collection vehicle to collect waste from the waste container upon determining that the waste container is required to have waste collected therefrom;
monitoring the access control signal; and
when the access control signal indicates that the current location of the waste container is not one of the one or more waste collection vehicle accessible locations within a pre-determined period of time from when the waste collection vehicle is assigned, changing a route of the waste collection vehicle to bypass the current location of the waste container.

12. The computerized method according to claim 9, wherein the execution of the non-transitory machine readable instructions by the processor further causes the server system to:
determine a movement of the waste container; and
determine a length of the movement of the waste container;
determine a new location of the waste container from the movement and the length of the movement; and
determine whether the new location of the waste container is one of the one or more waste collection vehicle accessible locations by comparing the new location to the one or more known waste collection vehicle accessible locations;
send a notification to the waste collection vehicle over the wireless communication network to collect the waste from the waste container when the new location is one of the one or more waste collection vehicle accessible locations and access to the waste container in the new location is not blocked by an object; and
reroute the waste collection vehicle along an optimum waste collection route to collect the waste from the waste container at the new location.

13. The computerized method according to claim 9, wherein the execution of the non-transitory machine readable instructions by the processor further causes the server system to:
determine that the access control signal following the rerouting of the waste collection vehicle indicates that the waste container is not in one of the one or more waste collection vehicle accessible locations;
send another notification to the operator of the waste container over the wireless communication network; and
reroute the waste collection vehicle to bypass the current location of the waste container when the access control signal does not indicate that the waste container is in one of the one or more waste collection vehicle accessible locations within a pre-determined period of time from the sending of the another notification.

14. The computerized method according to claim 9, wherein the execution of the non-transitory machine readable instructions by the processor further causes the server system to:
modify the optimal waste collection strategy for the waste collection vehicle based on one or more of a type of the waste collection vehicle and a type of waste to be collected from the waste container, a spatial location of the waste collection vehicle relative to at least one other waste collection vehicle, a status of the waste collection vehicle relative to the at least one other waste collection vehicle, a waste capacity status of the at least one other waste collection vehicle, a degree of access of a given type of the waste collection vehicle to a given waste container relative to a given type of access of at least one other waste collection vehicle to the waste container relative to at least one other waste collection vehicle, a current route of the waste collection vehicle relative to at least one other waste collection vehicle, current traffic conditions for the at least one waste collection vehicle relative to current traffic conditions of at least one other waste collection vehicle; and
wherein one or more of the waste collection vehicle and the at least one other waste collection vehicle is configured to change its current waste collection route in dependence upon the modified optimal strategy communicated from the server system to the waste collection vehicle and the at least one other waste collection vehicle.

15. The computerized method according to claim 9, wherein the execution of the non-transitory machine readable instructions by the processor further causes the server system to change a current waste collection route of the waste collection vehicle to a route that includes the current location of the waste container.

16. A computer program product recorded on non-transient machine-readable data storage media of a server system for receiving one or more signals via a wireless communication network from one or more sensors associated with a waster container, the computer program product being executable upon computing hardware including a processor, wherein execution of the computer program product by the processor is configured to cause the processor to:
determine from a signal sent over the wireless communication network by a waste status sensor associated with the waste container that the waste container is required to have waste collected therefrom, the waste status sensor being configured to determine one or more of a state of the waste container and a volume of waste in the waste container;
determine a location of the waste container based on a location signal provided from a spatial position determining sensor associated with the waste container;
compare the current location of the waste container to one or more known waste collection vehicle accessible locations;
determine whether the current location of the waste container is a waste collection vehicle accessible location based on the comparison;
send over the wireless communication network, a notification to an operator of the waste container when it is determined that the current location of the waste container is not one of the waste collection vehicle accessible locations;
detect an access control signal associated with the waste container, the access control signal indicating that the current location of the waste container is one of the waste collection vehicle accessible locations;
determine whether access to the waste container in the current location of the waste container is blocked by an object; and
when the access control signal indicates that the waste container is in one of the one or more waste collection vehicle accessible locations and access to the waste container is not blocked;

compute an optimal waste collection strategy for a waste collection vehicle to collect waste from the waste container at the current location; and automatically route the waste collection vehicle to the current location of the waste container; or when it is determined that the access control signal indicates that the waste container is not accessible in one of the one or more waste collection vehicle accessible locations, change a route of the selected waste collection vehicle to bypass the location of the waste container.

17. The computer program product according to claim 16, wherein the computer program product is further executable upon the computing hardware for causing the processor to:

monitor the access control signal after sending the notification; and after a pre-determined time period has elapsed, sending a second notification over the wireless communication network to the operator when the access control signal indicates that the current location of the waste container is not one of the one or more waste collection vehicle accessible locations.

18. The computer program product according to claim 16, wherein the computer program product is further executable upon the computing hardware to cause the processor to compute the optimal waste collection strategy for the waste collection vehicle by:

routing the waste collection vehicle to collect waste from the waste container upon determining that the waste container is required to have waste collected therefrom;

monitoring the access control signal; and when the access control signal indicates that the current location of the waste container is not one of the one or more waste collection vehicle accessible locations within a pre-determined period of time from when the waste collection vehicle is assigned, changing a route of the waste collection vehicle to bypass the current location of the waste container.

19. The computer program product according to claim 16, wherein the computer program product is further executable upon the computing hardware for causing the processor to:

determine a movement of the waste container; and determine a length of the movement of the waste container;

determine a new location of the waste container from the movement, the length of the movement and a location sensor associated with the waste container; and determine whether the new location of the waste container is one of the one or more waste collection vehicle accessible locations by comparing the new location to the one or more known waste collection vehicle accessible locations;

detect, from a signal sent by a sensor associated with the waste container, whether access to the waste container is blocked by an object;

send, over the wireless communication network, a notification to the waste collection vehicle to collect the waste from the waste container when the new location is one of the one or more waste collection vehicle accessible locations and access to the waste container in the new location is not blocked by an object; and reroute the waste collection vehicle along an optimum waste collection route to collect the waste from the waste container.

20. The computer program product according to claim 16, wherein the computer program product is further executable upon the computing hardware to cause the processor to change a current waste collection route of the waste collection vehicle to a route that includes the current location of the waste container.

* * * * *